US007203049B2

(12) United States Patent
Chu et al.

(10) Patent No.: US 7,203,049 B2
(45) Date of Patent: Apr. 10, 2007

(54) OVER-CURRENT PROTECTION DEVICE

(75) Inventors: Edward Fu-Hua Chu, Taipei (TW); David Shau-Chew Wang, Taipei (TW); Yun-Ching Ma, Pingtung (TW)

(73) Assignee: Polytronics Technology Corporation, Hsinchu (TW)

( * ) Notice: Subject to any disclaimer, the term of this patent is extended or adjusted under 35 U.S.C. 154(b) by 252 days.

(21) Appl. No.: 10/936,290

(22) Filed: Sep. 8, 2004

(65) Prior Publication Data

US 2005/0036257 A1 Feb. 17, 2005

Related U.S. Application Data

(62) Division of application No. 10/614,849, filed on Jul. 8, 2003, now Pat. No. 6,898,063.

(30) Foreign Application Priority Data

Jul. 12, 2002 (TW) ............................ 91210733 U

(51) Int. Cl.
*H02H 5/04* (2006.01)
*H01C 7/13* (2006.01)

(52) U.S. Cl. ...................... 361/105; 361/103; 361/106; 338/22 R; 338/203; 338/309; 338/327

(58) Field of Classification Search ................ 361/106, 361/104, 105; 338/22 R, 203, 308, 309, 338/327
See application file for complete search history.

(56) References Cited

U.S. PATENT DOCUMENTS 5,204,799 A * 4/1993 Stibila ........................ 361/104
5,293,297 A * 3/1994 Desai ......................... 361/106
5,852,397 A * 12/1998 Chan et al. ............... 338/22 R
6,211,771 B1 * 4/2001 Zhang et al. ............ 338/22 R

* cited by examiner

*Primary Examiner*—Brian Sircus
*Assistant Examiner*—Zeev Kitov
(74) *Attorney, Agent, or Firm*—Seyfarth Shaw LLP

(57) ABSTRACT

The over-current protection device of the present invention uses the unbalanced properties of the thermal expansion coefficients between the outer and inner sides for an upper metallic conductive sheet and a lower metallic conductive sheet to generate a torque to deform outwardly. The torque is used to pull a current-sensing element and present with at least a cracking face, so as to introduce an electrically open effect similar to a fuse. Thus, the present invention can achieve the object for preventing the danger of circuit system by the short circuit during the burning of over-current protection device.

5 Claims, 3 Drawing Sheets

OVER-CURRENT PROTECTION DEVICE

REFERENCE TO RELATED APPLICATIONS

This application is a division of U.S. application Ser. No. 10/614,849, filed Jul. 8, 2003 now U.S. Pat. No. 6,898,063, which claims the benefit of the priority date of Taiwan application no. 091210733, filed Jul. 12, 2002.

BACKGROUND OF THE INVENTION

1. Field of the Invention

The present invention relates to an over-current protection device, and more particularly, to an over-current protection device that becomes opened during burning or failure.

2. Description of Related Art

As portable electronics such as mobile phone, laptop computer, portable video camera, personal digital assistant etc. are widely used, the importance of the over-current protection device, used to prevent electronic devices from the occurrence of over-current or over-temperature, is increased.

FIG. 1 is a schematic diagram of an over-current protection device 10 according to the prior art. The over-current protection device 10 includes a current-sensing element 11, an upper metallic conductive sheet 16 and a bottom metallic conductive sheet 15. The current-sensing element 11 includes an upper electrode foil 13, a bottom electrode foil 12 and a conductive material 14 with a positive temperature coefficient (PTC). The upper metallic conductive sheet 16 and the bottom metallic conductive sheet 15 connect the surface of the upper electrode foil 13 and the bottom electrode foil 12, respectively, which can further connect a conductive wire in series to an electronic circuit or connect the positive and negative electrode of a secondary batter. The PTC conductive material 14 is made of a polymer and conductive filler.

Since the resistance of the PTC conductive material 14 is very sensitive to temperature variation, the resistance is kept at an extremely low level during normal operation and the electric circuit operates normally. However, if an over-current or over-temperature event occurs, the resistance will be increased instantaneously to a very high level such as beyond $10^4$ ohm to reversely eliminate the over-current and the achieve the protection of the electronic device.

However, when the conventional over-current protection device 10 is burned due to inappropriate use, the PTC layer 14 becomes carbonized and forms a highly conductive layer. Consequently, the upper metallic conductive sheet 16 and the lower metallic conductive sheet 15 connected to the positive and negative electrodes of the battery will be shorted, which is so called unsafe failure. As a result, the conventional over-current protection device 10 can not only achieve the circuit protection, but also endanger the use of the circuit system.

As the size of the secondary battery shrinks, the requirement for power efficiency and safety is increased. If the conventional over-current protection device 10 is assembled in an electronic device, there will be safety concerns for using the electronic device. Thus, it is necessary to provide an effective solution to this problem.

BRIEF DESCRIPTION OF THE INVENTION

The main object of the present invention is to provide an over-current protection device, which can prevent the device from the short circuit during burning and the danger of the circuit during usage.

To this end and to prevent the defects in the prior art, the present invention discloses an over-current protection device, which may be applied for battery protection in the mobile electronic devices. The device uses the unbalanced properties of the thermal expansion coefficients between the outer and inner sides for an upper metallic conductive sheet and a lower metallic conductive sheet to generate a torque to deform outwardly. The torque is used to pull a current-sensing element and is presented with at least a cracking face, so as to introduce an electrically open effect similar to a fuse. Thus, the present invention can achieve the object of preventing the circuit system from the short circuit during the burning of over-current protection device.

The first embodiment of the over-current protection device according to the present invention comprises a current-sensing element, an upper metallic conductive sheet, and a lower metallic conductive sheet. The surfaces of the upper metallic conductive sheet and the lower metallic conductive sheet are provided with at least a notch and the notch generates a cracking face in the current-sensing element during burning or failure to prevent the over-current protection device from the short circuiting.

The second embodiment of the over-current protection device according to the present invention comprises a current-sensing element, a second upper metallic conductive sheet, a first upper metallic conductive sheet, a second lower metallic conductive sheet, and a first lower metallic conductive sheet. The first upper metallic conductive sheet has a smaller thermal expansion coefficient than the second upper metallic conductive sheet, and the first lower metallic conductive sheet has a smaller thermal expansion coefficient than the second lower metallic conductive sheet. With such unequal thermal expansion coefficients, a cracking face will be generated in the current-sensing element during burning for the over-current protection device, so as to prevent the over-current protection device from the short circuiting.

BRIEF DESCRIPTION OF THE DRAWINGS

The present invention is described below by way of examples with reference to the accompanying drawings which will make readers easily understand the purpose, technical contents, characteristics and achievement of the present invention, wherein

FIG. 2(*b*) illustrates the open circuit status during burning for the over-current protection device in FIG. 2(*a*);

FIG. 3(*b*) illustrates the open circuit status during burning for the over-current protection device in FIG. 3(*a*).

DESCRIPTION OF THE PREFERRED EMBODIMENTS

Figure 1:
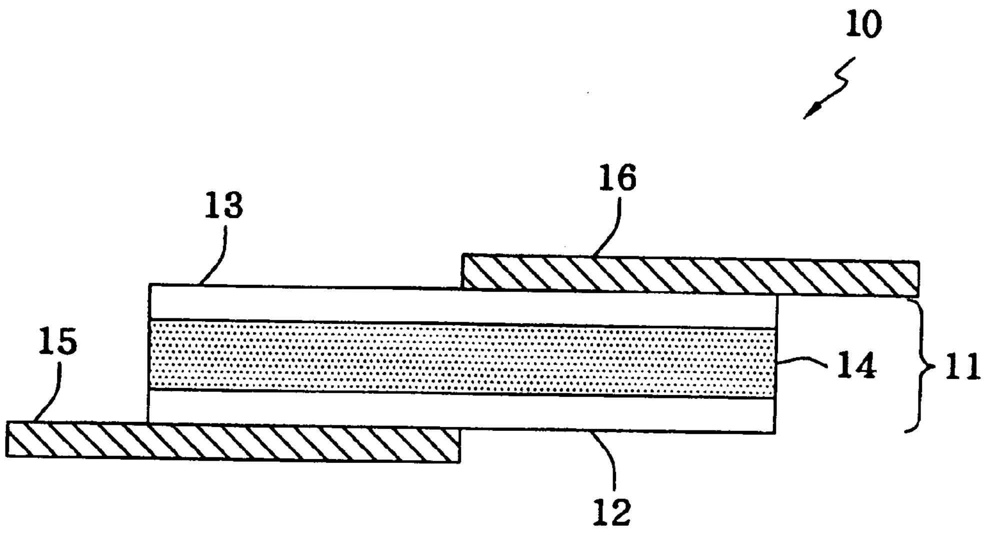
FIG. 1 (Prior Art)
FIG. 1 is a schematic diagram of an over-current protection device according to the prior art.
Figure 2A:
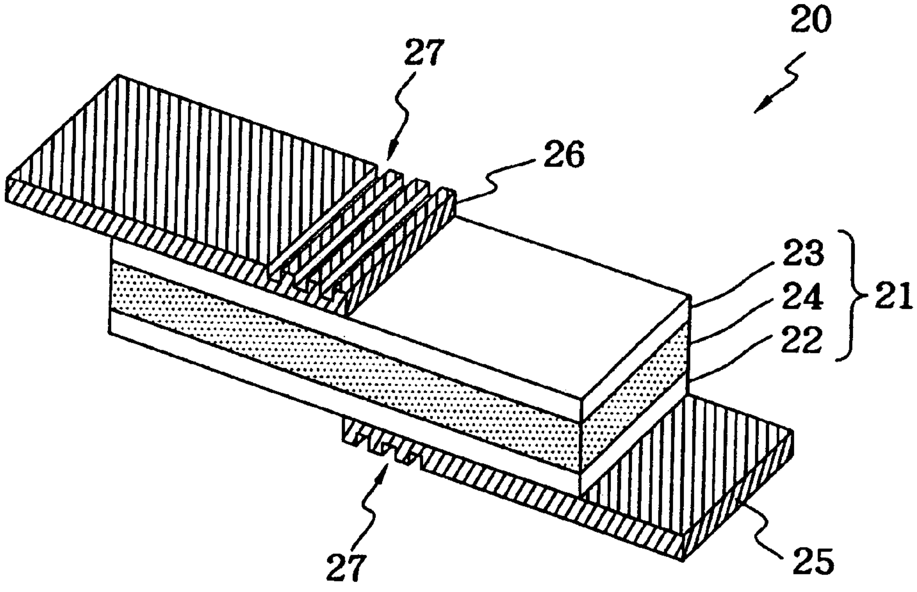
FIG. 2(*a*) shows an over-current protection device for the first embodiment according to the present invention.
Figure 2B:
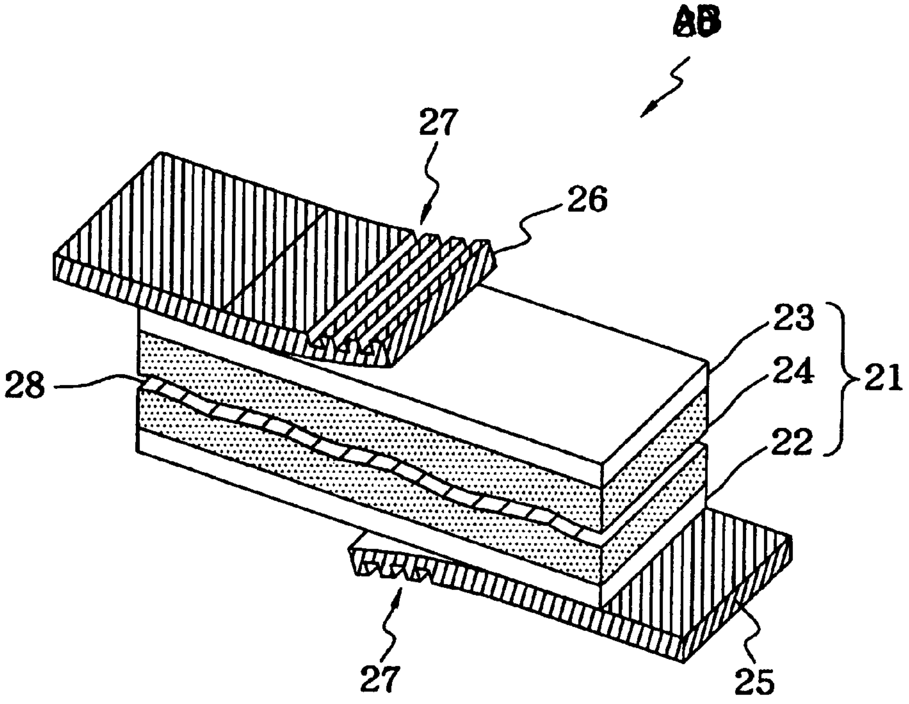

FIG. 2(*a*) illustrates an over-current protection device 20 for the first embodiment according to the present invention. The over-current protection device 20 comprises a current-sensing element 21, an upper metallic conductive sheet 26, and a lower metallic conductive sheet 25. The current-sensing element 21 is a positive temperature coefficient resistance device, which comprises an upper electrode foil 23, a lower electrode foil 22, and a positive temperature coefficient conductive material 24. The over-current protection device 20 is different from the prior art primarily in that the surfaces of the upper metallic conductive sheet 26 and the lower metallic conductive sheet 25 of the present invention comprises at least one notch 27 formed by a cutter or an etching process. FIG. 2(*a*) illustrates the notch as a plurality of parallel lines to reduce the surface area of the upper metallic conductive sheet 26 and the lower metallic conductive sheet 25. Therefore, the notch 27 of the present invention is not limited to specific shapes in the practical applications, such as meshes, waves, gaps, or other irregular shapes.

FIG. 2(*b*) illustrates the open circuit status during burning of the over-current protection device in FIG. 2(*a*). When the over-current protection device 20 of the present invention is burned at a high temperature, the positive temperature coefficient conductive material 24 will be carbonized and become easy to crack. At this point, since the outer surfaces of the upper metallic conductive sheet 26 and the lower metallic conductive sheet 25 are provided with a plurality of notches 27, a torque is generated to deform outwardly due to the unbalanced thermal expansion coefficients of the outer and inner sides for the upper metallic conductive sheet 26 and the lower metallic conductive sheet 27. The torque will continuously pull the current-sensing element 21, and finally introduce at least one cracking face 28 on the carbonized positive temperature coefficient conductive material 24, or generate a cracking face at another weak point of the device. Because of the existence of the cracking face 28, air will be introduced to cause an electrically open effect similar to a fuse. As a result, the present invention can achieve the object for preventing the system from the danger caused by the short circuit during the burning of the over-current protection device. The area of the notch according to the present invention is preferably at least over 1% of the area for the upper metallic conductive sheet 26 and the lower metallic conductive sheet 25, more preferably over 3%, and most preferably over 5%, which will make more obvious effect for generating the cracking face 28.

Figure 3A:
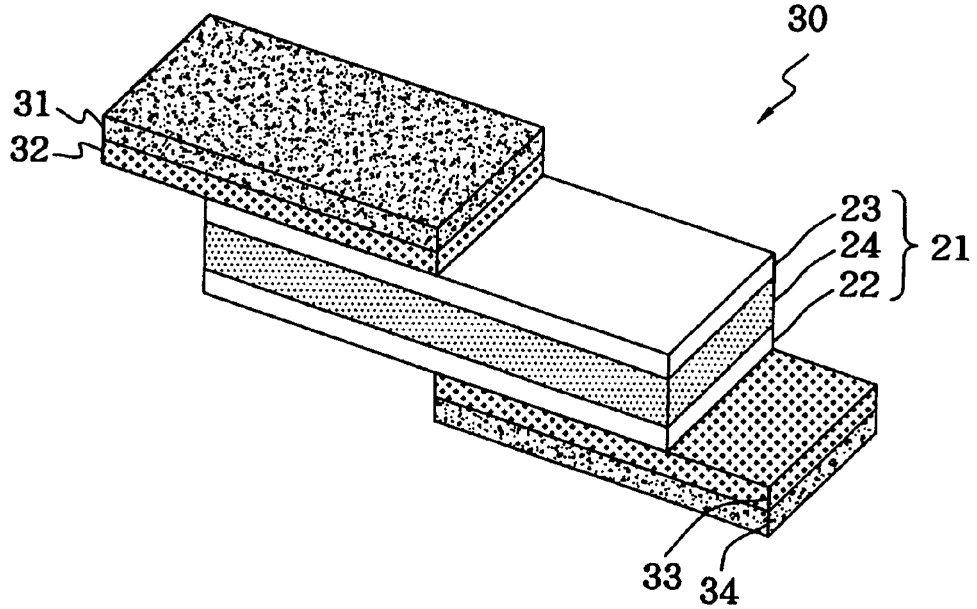
FIG. 3(*a*) illustrates the over-current protection device for the second embodiment according to the present invention.
Figure 3B:
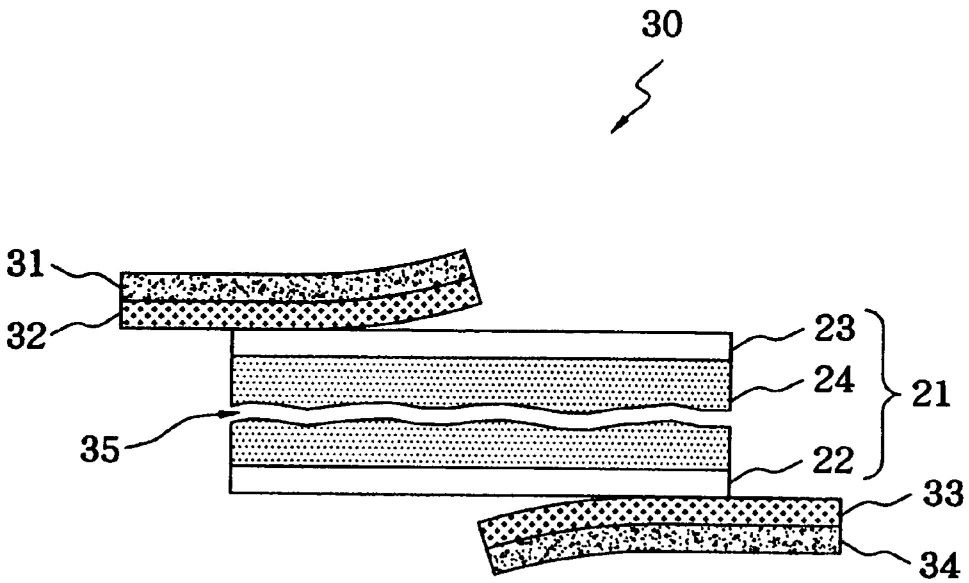

FIG. 3(*a*) illustrates the over-current protection device 30 for the second embodiment according to the present invention. The over-current protection device 30 is different from the first embodiment in that the upper metallic conductive sheet of the over-current protection device 30 is composed of a first upper metallic conductive sheet 31 with a smaller thermal expansion coefficient and a second upper metallic conductive sheet 32 with a larger thermal expansion coefficient; and, the lower metallic conductive sheet is composed of a first lower metallic conductive sheet 34 with a smaller thermal expansion coefficient and a second lower metallic conductive sheet 33 with a larger thermal expansion coefficient. The first upper metallic conductive sheet 31 and the first lower metallic conductive sheet 34 are made of a material selected from the group consisting of chromium, nickel, iron, cobalt, tungsten, titanium and the alloy thereof. The second upper metallic conductive sheet 32 and the second lower metallic conductive sheet 33 are made of a material selected from the group consisting of copper, aluminum, stannum, lead, silver, platinum, gold and the alloy thereof.

FIG. 3(*b*) illustrates the open circuit status during burning of the over-current protection device 30 in FIG. 3(*a*). When the over-current protection device 30 of the present invention is burned at a high temperature, the positive temperature coefficient conductive material 24 will be carbonized and become easy to crack. At this status, since the thermal expansion coefficient for the first upper metallic conductive sheet 31 is smaller than that of the second upper metallic conductive sheet 32, and the thermal expansion coefficient for the first lower metallic conductive sheet 34 is smaller than that of the second lower metallic conductive sheet 33, a torque is generated to deform outwardly due to the unbalanced thermal expansion coefficients of the upper metallic conductive sheet and the lower metallic conductive sheet. The torque will continuously pull the current-sensing element 21, and finally introduce at least one cracking face 35 for the carbonized positive temperature coefficient conductive material 24. Since the existence of at least on cracking face 35, it can cause an electrically open effect, so that the present invention can achieve the object of preventing the system from the danger caused by the short circuit during the burning of the over-current protection device 30. The surfaces of the first upper metallic conductive sheet 31 and the first lower metallic conductive sheet 34 for the over-current protection device 30 may be provided with notches by a cutter, so as to enhance the torque effect deforming outwardly during burning in high temperature.

The above-described embodiments of the present invention are intended to be illustrative only. Numerous alternative embodiments may be devised by those skilled in the art without departing from the scope of the following claims.

What is claimed is:

1. An over-current protection device, comprising:

a current-sensing element exhibiting positive temperature coefficient behavior, the current-sensing element including an upper electrode foil, a bottom electrode foil and a conductive material;

an upper metallic conductive sheet comprising:

a first upper metallic conductive sheet; and a second upper metallic conductive sheet located between and attached physically to the first upper metallic conductive sheet and the upper electrode foil wherein the thermal expansion coefficient of the first upper metallic conductive sheet is smaller than that of the second upper metallic conductive sheet; and a bottom metallic conductive sheet, comprising:

a first bottom metallic conductive sheet; and a second bottom metallic conductive sheet located between and attached to the first bottom metallic conductive sheet and the bottom electrode foil, wherein the thermal expansion coefficient of the first bottom metallic conductive sheet is smaller than that of the second bottom metallic conductive sheet;

whereby unbalanced thermal expansion coefficients of the upper metallic conductive sheet and the bottom metallic conductive sheet generate a torque to deform outwardly during a burning of the over-current protection device, and at least one crack surface is generated in the current-sensing element.

2. The over-current protection device according to claim 1, wherein the first upper metallic conductive sheet and the first bottom metallic conductive sheet are made of a material selected from the group consisting of chromium, nickel, iron, cobalt, tungsten, titanium and the alloy thereof.

3. The over-current protection device according to claim 1, wherein the second upper metallic conductive sheet and the second bottom metallic conductive sheet are made of a material selected from the group consisting of copper, aluminum, stannum, lead, silver, platinum, gold and the alloy thereof.

4. The over-current protection device according to claim 1, wherein at least one of the metallic conductive sheets comprises a notch on the. surface.

5. The over-current protection device according to claim 1, which is applied to a battery protection of a portable electronic device.

* * * * *